April 8, 1958 C. E. KEATING 2,829,702
HIGH STRENGTH SAFETY SEAT
Filed Oct. 27, 1955 2 Sheets-Sheet 1

INVENTOR.
CHARLES E. KEATING
BY
*ATTORNEYS*

United States Patent Office 2,829,702
Patented Apr. 8, 1958

2,829,702

HIGH STRENGTH SAFETY SEAT

Charles E. Keating, Burbank, Calif., assignor, by mesne assignments, to the United States of America as represented by the Secretary of the Navy Application October 27, 1955, Serial No. 543,288

10 Claims. (Cl. 155—2)

The present invention relates to a new and novel high strength safety seat for use in rapidly moving vehicles and more particularly to such a seat wherein the body of the occupant is supported within a resilient net which is secured to resilient supporting straps suitably connected to the interior of the vehicle.

The present invention is especially adapted for use in modern aircraft to provide adequate protection to aircraft personnel other than the pilot thereof during crash landings or other emergency conditions. As is well-known, the mortality rate among passengers of aircraft is exceedingly high in crashes of such aircraft, and serious injuries often occur due to inadequate physical protection for the passengers.

Various methods have been previously employed for minimizing injuries in aircraft crashes such as lying on the floor of the aircraft adjacent a bulkhead or utilizing conventional safety belts for maintaining the personnel in their seats. Both of these methods have proven unsatisfactory and have obvious deficiencies as hereinafter pointed out. It is evident that merely lying on the floor of an aircraft provides little or no protection since due to the high speed of present day aircraft, a passenger will be thrown forward against the bulkhead or other structure with such force as to seriously injure him. The utilization of safety belts has proven to be the most popular and simplest safety precaution, yet is quite unsatisfactory due to the fact that the passenger is thrown forward with such force that serious internal injuries result due to the fact that the safety belt engages only a small vital portion of the passenger's anatomy; and furthermore the entire seat often shears off in such crashes thereby causing the safety belt to be completely valueless.

In the present invention, the occupant of the safety seat is supported within a net formed of resilient material which is supported by resilient straps suitably secured to the interior of the aicraft or vehicle. The supporting straps are secured at the opposite ends thereof to the roof and floor of the vehicle in such a manner that the occupant of the seat is facing in an aft direction. With this arrangement, the deceleration forces are absorbed over a large rear portion of the occupant's body and it has been found that the human body is better adapted to absorb large forces in this manner than in the forward facing position conventionally assumed, for example, in aircraft. The resilient supporting straps and the resilient net which supports the passenger's body stretches sufficiently to absorb the shock loads of a plane crash and recovers slowly to its original shape. The invention device is very flexible and may be stowed in a small space and yet may be quickly installed and occupied in an emergency. The invention device also provides a soft and pliable support which has no sharp or hard protruding parts which can cut or otherwise injure the occupant.

An object of the present invention is a provision of a new and novel high strength safety seat which provides support over a large portion of an occupant's body and more efficiently distributes loads on the body of the occupant.

Another object is the provision of a high strength safety seat which gives maximum protection to the occupant and yet which is extremely flexible and may be stowed in a small space.

A further object is to provide a high strength safety seat which is simple and inexpensive in construction yet sturdy and reliable in operation.

Other objects and many of the attendant advantages of this invention will be readily appreciated as the same becomes better understood by reference to the following detailed description when considered in connection with the accompanying drawings wherein.

All of the straps, the body supporting net and the stitching utilized in the invention device must be of a strong material which is resilient and stretches sufficiently to absorb shock loads, yet recovers slowly to its original shape, and the material must be soft and pliable to accomplish the purpose of the invention. Any suitable material having these characteristics may be employed; however, it is considered preferable to utilize nylon, and it should be understood that in the following description each of the straps and the body supporting net is composed of nylon.

Figure 1:
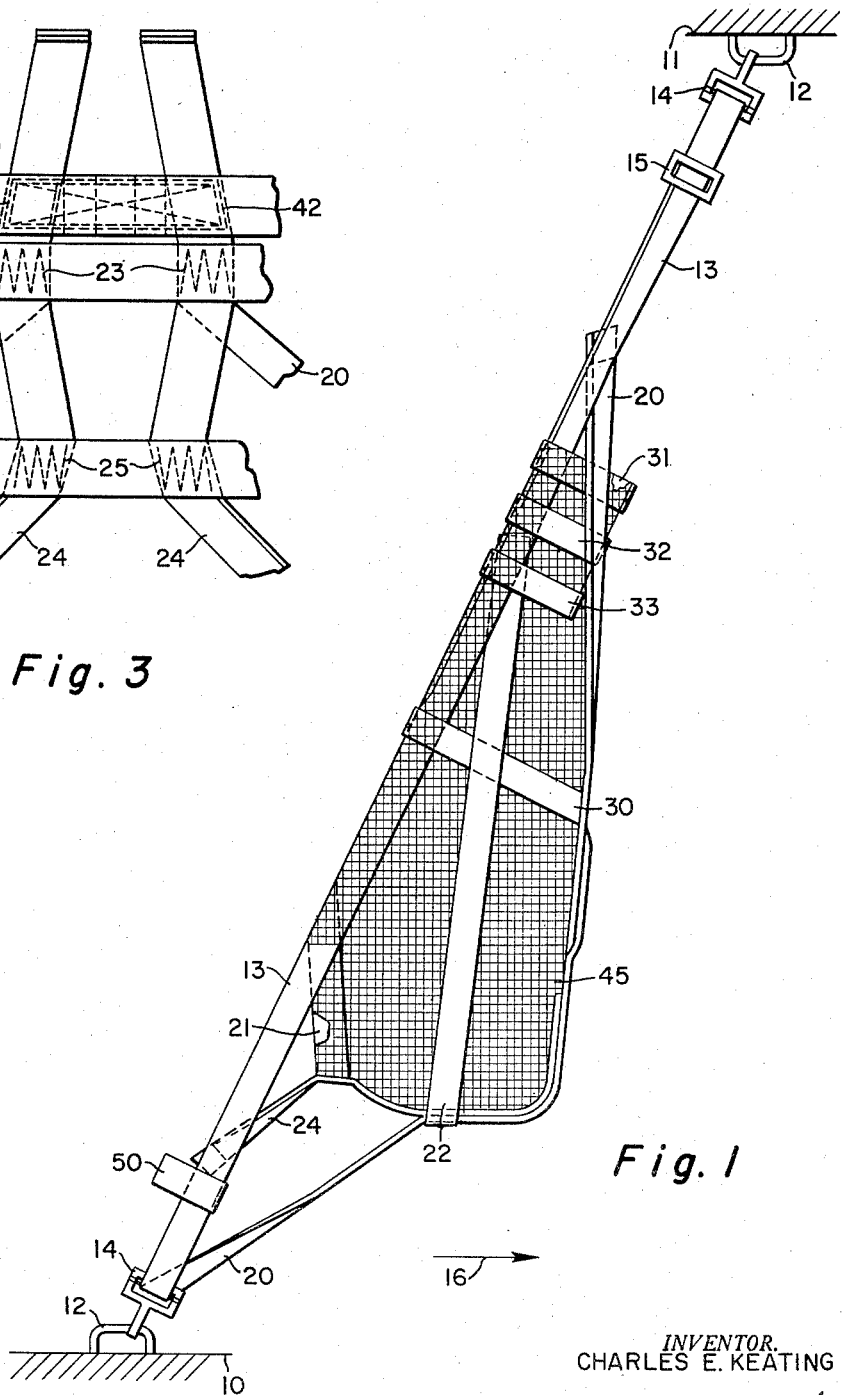
Fig. 1 is a side view of the invention device suspended in operative position.
Figure 2:
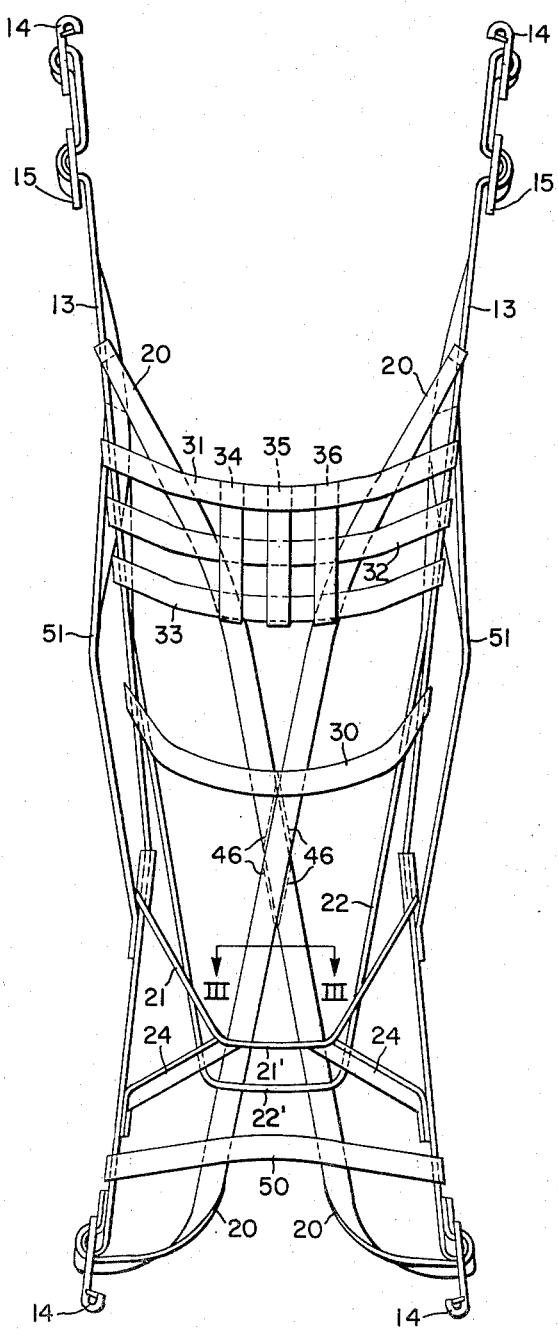
Fig. 2 is a front view of the device shown in Fig. 1 with certain members removed for the sake of clarity.

Referring now to the drawings wherein like reference characters designate similar parts throught the several views, there is shown in Fig. 1 a fixed support 10 which may be for example the floor of an aircraft, and another fixed support 11 which in this example is the ceiling of the aircraft, the floor and ceiling having mounted thereon four suitable supporting brackets 12 only two of which are shown. As seen more clearly in Fig. 2, the invention device includes two similar riser straps 13 having conventional high strength fastener fittings 14 suitably secured to the opposite ends thereof which are adapted to be connected to brackets 12 to thereby suspend the device in operative position as shown in Figs. 1 and 2. Conventional strap adapters 15 are provided to properly adjust the length of the riser straps in a well-known manner.

The direction of motion of the aircraft is indicated by arrow 16, and it is therefore evident that the upper end of the risers are connected to the ceiling of the aircraft forwardly, with respect to the aircraft, of the lower ends of the riser straps which are connected to the floor of the aircraft. In this manner, the device is suspended in such a position that an occupant therein faces in the aft direction.

Two similar back straps 20 each have one end thereof connected to the lower portion of one of the riser straps and the upper end thereof connected to the upper portion of the opposite riser strap, the two back straps passing over one another and being suitably secured to one another as by stitching.

A front seat strap 21 has the opposite ends thereof suitably secured to riser straps 13 at an oblique angle thereto such that in the operative position shown, the front seat strap is suspended in a substantially downward direction relative to the direction of flight of the aircraft. A rear seat strap 22 has the opposite ends thereof connected to the two riser straps at an oblique angle thereto and is also suspended in a substantially downward direction relative to the direction of flight of the aircraft. It should be noted that each of the seat straps 21 and 22 forms a cradle having a flattened bottom portion 21' and 22' respectively and that the bottom portion of rear seat strap 22 is vertically below that of front seat strap 21 when in operative position as shown.

Figure 3:
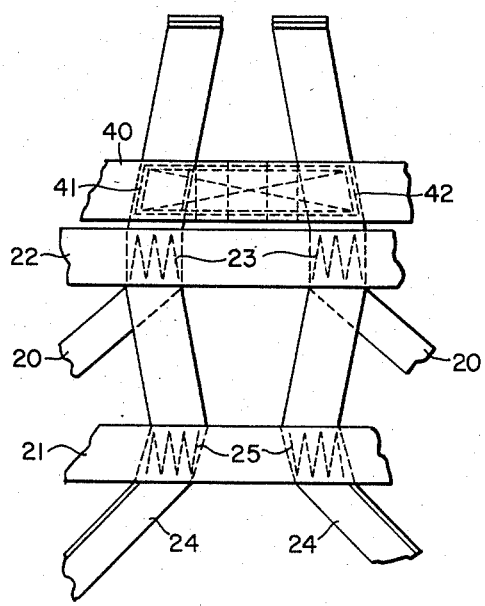
Fig. 3 is a view taken on the line III—III of Fig. 2 looking in the direction of the arrows.

The rear seat strap is also secured to each of the back straps 20 as by stitching 23 which may be more clearly seen in Fig. 3.

Two similar forward tie straps 24 each have one end thereof secured to one of the riser straps at an oblique angle thereto and the other end thereof is secured to one of the back straps and the rear seat strap by stitching 23, the forward tie straps also being connected to the forward seat strap 21 by stitching 25.

A shoulder strap 30 has the opposite ends thereof secured to the two riser straps at substantially right angles thereto and is also secured by stitching to the two back straps immediately above the portions of the back straps which are secured to one another.

Three equally spaced generally horizontally extending head straps 31, 32, 33 each have the opposite ends thereof secured to the two riser straps at substantially right angles thereto whereby these three straps are suspended substantially parallel to one another. Three generally vertically extending head straps 34, 35, and 36 each have one end thereof secured to strap 31 and the opposite end thereof secured to strap 33 and are so arranged that they are substantially parallel to one another.

A conventional safety belt 40 shown in Fig. 3 is incorporated in the device and is secured to each of back straps 20 and each of the forward tie straps 24 by stitching 41 and 42. A resilient net 45 has the opposite lateral edge portions thereof secured to risers 13, the upper edge thereof secured to head strap 31, and the lower edge secured to front seat strap 21. Straps 21 and 31 may accordingly be designated supporting straps since taken in conjunction with riser straps 13, they provide support for the net along the edge portions thereof. The net is secured to the back straps by stitching 46, and the net is also secured to the back straps, the forward tie straps and the safety belt by means of stitching 41 and 42.

It is apparent that when the device is suspended in operative position as shown in Fig. 1, an occupant may sit in the lower portion of net 45 with the buttocks and thighs of the occupant being supported by rear seat strap 22 and forward seat strap 21 respectively. Shoulder strap 30 supports the upper portion of the back of the occupant, and the occupant's head is supported by the head straps 31—36.

An ankle strap 50 has the opposite ends thereof connected to the two riser straps at substantially right angles thereto, and the occupant's legs are positioned such that they are adjacent the inner surface of the angle strap which faces the net 45 thereby preventing the occupant's legs from flying upward and tending to pivot the occupant clockwise relative to the device as seen in Fig. 1.

Two hand straps 51 each have the opposite ends thereof connected to the same riser strap such that the hand straps are disposed substantially parallel to the riser straps, but have a small amount of slack therein as shown in Fig. 2.

It is evident that the device is extremely flexible and may be rolled up when stowed so as to occupy a very small space. Any conventional quick-release device may be utilized for stowing the invention safety seat.

The operation of the device is as follows:

In an emergency, the invention device is unstowed and the riser straps secured to suitable brackets within the aircraft by means of fittings 14 such that the device is suspended in the position shown in Fig. 1. The passenger then seats himself within the net in the position previously described and fastens safety belt 40. The occupant then crosses his hands over his chest grasping the right hand strap with his left hand and the left hand strap with his right hand. The occupant is then in position within the device and is adapted to absorb maximum loading on his body with a minimum risk of physical injury.

It is apparent from the foregoing that there is provided a new and novel high strength safety seat which provides support over a large portion of the body of the occupant to more efficiently distribute loads on the body. The occupant is positively secured within the device to provide maximum protection and the device has no sharp or hard parts which might damage the occupant. The safety seat may be stowed in a small space and is simple and inexpensive in construction, yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A high strength safety seat which comprises a plurality of spaced flexible riser straps, means for connecting the opposite ends of each of said riser straps to a supporting structure to thereby support the riser straps in operative position, said riser straps in an operative position extending in length greater than the length of the occupant's body when seated to support the entire body between the ends of the riser straps, a plurality of supporting straps each of which has the opposite ends thereof respectively secured to different ones of said riser straps, and a resilient body supporting net having upper and lower edge portions and two lateral edge portions connecting said upper and lower edge portions, each of said lateral edge portions being secured along its length to one of said riser straps, said upper edge portion being secured along its length to one of said supporting straps, and said lower edge portion being secured along its length to another of said supporting straps.

2. A device as defined in claim 1 including a plurality of back straps each of which has the opposite end portions thereof respectively secured to different ones of said riser straps, said back straps being secured to one another and an intermediate portion of said net.

3. A device as defined in claim 2 including a rear seat strap disposed between said supporting straps, said rear seat strap having its opposite end portions secured to different ones of said riser straps and connected at intermediate portions thereof to said back straps, and a plurality of forward tie straps each of which has one end portion thereof secured to one of said riser straps and the opposite end portion thereof secured to one of said back straps.

4. A device as defined in claim 3 including a shoulder strap having its opposite end portions secured to different ones of said riser straps at a point substantially midway between the connections of said supporting straps to each of said riser straps.

5. A device as defined in claim 1 including an ankle strap having the opposite end portions thereof secured to different ones of said riser straps adjacent one end of said riser straps, a safety belt secured to said back straps and said net for maintaining an occupant within said net, and a plurality of hand straps each of which is disposed substantially parallel to one of said riser straps and has the opposite ends thereof respectively secured to one of said riser straps.

6. A high strength safety seat which comprises a plurality of spaced resilient riser straps, means for connecting the opposite ends of each of said riser straps to a supporting structure to thereby suspend the riser straps in operative position, said riser straps in an operative position extending in length greater than the length of the occupant's body when seated to support the entire body between the ends of the riser straps, a plurality of back straps each of which has its opposite end portions respectively secured to different ones of said riser straps, a front seat strap having its opposite end portions secured to different ones of said riser straps at an oblique angle thereto, a rear seat strap having its opposite end portions secured to different ones of said riser straps at an oblique angle thereto, intermediate portions of said rear seat strap being secured to intermediate portions of said back straps, a plurality of forward tie straps each of which has one end portion thereof secured to one of said riser straps and the opposite end portion thereof secured to one of said back straps, a shoulder strap having its opposite end portions secured to different ones of said riser straps at substantially right angles thereto, a plurality of horizontal head straps each of which has its opposite end portions respectively secured to different ones of said riser straps at substantially right angles thereto, a plurality of vertical head straps each of which has its opposite end portions secured respectively to different ones of said horizontal head straps at substantially right angles thereto, and a resilient body supporting net having upper and lower edge portions and two lateral edge portions connecting said upper and lower edge portions, each of said lateral edge portions being secured along its length to one of said riser straps, said upper edge portion being secured along its length to one of said horizontal head straps, said lower edge portion being secured along its length to said front seat strap.

7. A device as defined in claim 6 including an ankle strap having the opposite end portions thereof secured to different ones of said riser straps adjacent one end of said riser straps, a safety belt secured to said back strap and said net for maintaining the occupant within said net, and a plurality of hand straps each of which is disposed substantially parallel to one of said riser straps and has the opposite ends thereof respectively secured to one of said riser straps.

8. A high strength safety seat which comprises a plurality of spaced resilient riser straps, means for connecting the opposite ends of each of said riser straps to a supporting structure to thereby support the riser straps in operative position, said riser straps in an operative position extending in length greater than the length of the occupant's body when seated to support the entire body between the ends of the riser straps, a plurality of back straps each of which has its opposite end portions respectively secured to different ones of said riser straps at an oblique angle thereto, said back straps being crossed over one another and secured to each other, a front seat strap having its opposite end portions secured to different ones of said riser straps at an oblique angle thereto, a rear seat strap having its opposite end portions secured to different ones of said riser straps at an oblique angle thereto, the lowermost portion of said rear seat strap being disposed vertically below the lowermost portion of said front seat strap when the device is in operative position, intermediate portions of said rear seat strap being secured to intermediate portions of said back straps, a plurality of forward tie straps each of which has one end portion thereof secured to one of said riser straps and the opposite end portion thereof secured to one of said back straps, each of said forward tie straps being secured to said front seat strap and said back seat strap, a shoulder strap having its opposite end portions secured to different ones of said riser straps at substantially right angles thereto, a plurality of horizontal head straps each of which has its opposite end portions respectively secured to different ones of said riser straps at substantially right angles thereto, a plurality of vertical head straps each of which has its opposite end portions respectively secured to different ones of said horizontal head straps at substantially right angles thereto, and a resilient body supporting net having upper and lower edge portions and two lateral edge portions connecting said upper and lower edge portions, each of said lateral edge portions being secured along its length to one of said riser straps, said upper edge portion being secured along its length to one of said horizontal head straps, and said lower edge portion being secured along its length to said front seat strap.

9. A device as defined in claim 8 including an ankle strap having the opposite end portions thereof secured to different ones of said riser straps adjacent one end of said riser straps, a safety belt secured to said back straps and said net for maintaining the occupant within said net, and a plurality of hand straps each of which is disposed substantially parallel to one of said riser straps and has the opposite ends thereof respectively secured to one of said riser straps.

10. In combination with an aircraft fuselage, a high strength passenger seat which comprises a pair of spaced resilient riser straps, upper and lower means for connecting the opposite ends of each of said riser straps to supporting structure on said fuselage, the secured ends of each riser strap respectively lying in spaced parallel planes normal to the longitudinal axis of the fuselage suspending the riser straps in operative position substantially in a plane oblique with respect to said axis, the plane containing the upper means being forward of the other plane with respect to the direction of aircraft's movement, a pair of back straps each of which has opposite end portions respectively secured to different riser straps and arranged to cross each other, a front seat strap having its opposite end portions secured to different ones of said riser straps, a rear seat strap having its opposite end portions secured to different ones of said riser straps, an ankle strap having its opposite end portions secured to different ones of said riser straps, a resilient body supporting net having upper and lower edge portions and two lateral edge portions connecting said upper and lower edge portions, each of said lateral portions being secured along its length to one of said riser straps, said lower edge portion being secured along its length to said front seat strap, said front seat strap, rear seat strap and the major portion of the back straps lying in spaced planes extending substantially normal to said longitudinal axis.

References Cited in the file of this patent

UNITED STATES PATENTS

| 1,035,642 | Rosse | Aug. 13, 1912 |
| 2,463,330 | Stretch | Mar. 1, 1949 |
| 2,577,817 | Scheuder et al. | Dec. 11, 1951 |

FOREIGN PATENTS

| 207,434 | Germany | Mar. 2, 1909 |
| 379,772 | Germany | Aug. 27, 1923 |

OTHER REFERENCES

CADO Technical Data Digest, vol. 16, issue 4, p. 4.